(12) United States Patent
Lee et al.

(10) Patent No.: US 11,192,342 B2
(45) Date of Patent: Dec. 7, 2021

(54) INTERIOR AND EXTERIOR MATERIALS FOR AUTOMOBILE COMPRISING POLYESTER RESIN FOAM LAYER AND FIBER LAYER

(71) Applicant: HUVIS CORPORATION, Seoul (KR)

(72) Inventors: Kwang Hee Lee, Daejeon (KR); Mee Huh, Daejeon (KR); Woo Jin Kim, Daejeon (KR); Seung Jun Lee, Jeollanam-do (KR)

(73) Assignee: HUVIS CORPORATION, Seoul (KR)

( * ) Notice: Subject to any disclaimer, the term of this patent is extended or adjusted under 35 U.S.C. 154(b) by 156 days.

(21) Appl. No.: 15/764,591

(22) PCT Filed: Jun. 30, 2016

(86) PCT No.: PCT/KR2016/007087
§ 371 (c)(1),
(2) Date: Mar. 29, 2018

(87) PCT Pub. No.: WO2017/057827
PCT Pub. Date: Apr. 6, 2017

(65) Prior Publication Data
US 2018/0272653 A1    Sep. 27, 2018

(30) Foreign Application Priority Data

Sep. 30, 2015 (KR) .......... 10-2015-0138204
Sep. 30, 2015 (KR) .......... 10-2015-0138206
(Continued)

(51) Int. Cl.
*B32B 27/06*    (2006.01)
*B32B 27/08*    (2006.01)
(Continued)

(52) U.S. Cl.
CPC .............. *B32B 27/065* (2013.01); *B32B 5/18* (2013.01); *B32B 5/245* (2013.01); *B32B 7/12* (2013.01);
(Continued)

(58) Field of Classification Search
CPC ....... B32B 27/065; B32B 5/245; B32B 27/12; B32B 7/12; B32B 27/08; B32B 27/06;
(Continued)

(56) References Cited

U.S. PATENT DOCUMENTS 4,554,206 A * 11/1985 Hilbert ............... C08G 63/6826
428/198
5,000,991 A    3/1991 Hayashi et al.
(Continued)

FOREIGN PATENT DOCUMENTS

EP    2881249 A1    6/2015
JP    H08246225 A    9/1996
(Continued)

OTHER PUBLICATIONS

Machine Translation of JP 2004-330711(A). (Year: 2004).*
(Continued)

*Primary Examiner* — Brian Handville
(74) *Attorney, Agent, or Firm* — Meunier Carlin & Curfman LLC (57) ABSTRACT

The present invention relates to interior and exterior materials for an automobile, comprising: a polyester resin foam layer; and a fiber layer laminated on one side or both sides of the polyester resin foam layer. The interior and exterior materials for an automobile can enhance durability and strength, reduce weight, and improve a work environment.

5 Claims, 2 Drawing Sheets

(30) Foreign Application Priority Data

| Dec. 8, 2015 | (KR) | 10-2015-0174209 |
|---|---|---|
| Dec. 16, 2015 | (KR) | 10-2015-0180284 |
| Apr. 29, 2016 | (KR) | 10-2016-0052879 |
| Apr. 29, 2016 | (KR) | 10-2016-0052897 |
| Apr. 29, 2016 | (KR) | 10-2016-0053054 |

(51) Int. Cl.
```
B60N 2/68      (2006.01)
C08J 5/12      (2006.01)
C08L 67/03     (2006.01)
B60N 2/30      (2006.01)
C08J 9/00      (2006.01)
B60R 13/02     (2006.01)
B32B 5/24      (2006.01)
B32B 5/18      (2006.01)
B32B 27/36     (2006.01)
B32B 7/12      (2006.01)
B32B 27/12     (2006.01)
B60R 13/04     (2006.01)
```

(52) U.S. Cl.
CPC ............ *B32B 27/06* (2013.01); *B32B 27/08* (2013.01); *B32B 27/12* (2013.01); *B32B 27/36* (2013.01); *B60N 2/30* (2013.01); *B60N 2/68* (2013.01); *B60R 13/02* (2013.01); *B60R 13/0212* (2013.01); *B60R 13/04* (2013.01); *C08J 5/12* (2013.01); *C08J 9/00* (2013.01); *C08L 67/03* (2013.01); *B32B 2262/0276* (2013.01); *B32B 2262/0284* (2013.01); *B32B 2266/0264* (2013.01); *B32B 2305/022* (2013.01); *B32B 2307/102* (2013.01); *B32B 2307/518* (2013.01); *B32B 2307/546* (2013.01); *B32B 2307/718* (2013.01); *B32B 2307/732* (2013.01); *B32B 2367/00* (2013.01); *B32B 2605/00* (2013.01); *B32B 2605/003* (2013.01)

(58) Field of Classification Search
CPC ..... B32B 5/18; B32B 27/36; B32B 2307/732; B32B 2262/0276; B32B 2307/518; B32B 2605/003; B32B 2307/546; B32B 2307/718; B32B 2367/00; B32B 2305/022; B32B 2605/00; B32B 2262/0284; B32B 2266/0264; B32B 2307/102; B60N 2/30; B60N 2/68; B60R 13/04; B60R 13/0212; B60R 13/02; C08L 67/03; C08J 9/00; C08J 5/12
See application file for complete search history.

(56) References Cited

U.S. PATENT DOCUMENTS

| 7,238,401 | B1* | 7/2007 | Dietz | B32B 17/10009 428/343 |
|---|---|---|---|---|
| 2002/0187300 | A1* | 12/2002 | Nakasuji | B32B 37/1207 428/95 |

FOREIGN PATENT DOCUMENTS

| JP | 2001-001436 | 1/2001 |
|---|---|---|
| JP | 2001-001436 A | 1/2001 |
| JP | 2004-106409 | 4/2004 |
| JP | 2004-330711 | 11/2004 |
| JP | 2004-330711 A | 11/2004 |
| JP | 2005-120250 A | 5/2005 |
| JP | 2009-113371 | 5/2009 |
| JP | 2009-113371 A | 5/2009 |
| JP | 2009-234261 | 10/2009 |
| JP | 2011-90042 A | 5/2011 |
| JP | 2012-106578 | 6/2012 |
| JP | 2012-171094 A | 9/2012 |
| JP | 2013-126790 | 6/2013 |
| JP | 2013-209777 | 10/2013 |
| JP | 5825800 | 12/2015 |
| KR | 10-1997-0033798 | 7/1997 |
| KR | 10-0178523 | 5/1999 |
| KR | 10-2000-0077235 | 12/2000 |
| KR | 10-0363291 | 5/2003 |
| KR | 10-2008-0027177 | 3/2008 |
| KR | 10-2011-0034522 | 4/2011 |
| KR | 10-2011-0082484 | 7/2011 |
| KR | 10-2012-0058347 | 6/2012 |
| KR | 10-2013-0120567 | 11/2013 |
| KR | 10-1387465 | 4/2014 |
| KR | 101387465 B1 | 4/2014 |
| KR | 10-2014-0103207 | 8/2014 |
| KR | 10-2016-0036191 | 4/2016 |

OTHER PUBLICATIONS

Machine Translation of KR 10-1387465(B1). (Year: 2014).*
Machine Translation of JP 2001-001436 A. (Year: 2001).*
Machine Translation of JP 2009-113371 A. (Year: 2009).*
International Search Report dated Oct. 27, 2016, from International Application No. PCT/KR2016/007087, 2 pages (non-English).
Extended European Search Report issued for Application No. 16851975.9, dated Mar. 11, 2019, 8 pages.
Office Action issued for Japanese Application No. 2018-516547, dated May 7, 2019. English Translation included.
Office Action issued for Japanese Application No. 2018-516548, dated Mar. 19, 2019. English Translation included.

* cited by examiner

INTERIOR AND EXTERIOR MATERIALS FOR AUTOMOBILE COMPRISING POLYESTER RESIN FOAM LAYER AND FIBER LAYER

TECHNICAL FIELD

The present invention relates to vehicle interior or exterior materials including a polyester resin foam layer and a fiber layer.

BACKGROUND ART

There is a need for the development of useful materials which can satisfy physical properties such as lightness of weight and durability at the same time in various industrial fields such as buildings, automobiles, and foods.

Among them, in the automobile industry, a lot of effort has been made to reduce the weight of automobiles in order to reduce fuel consumption of the automobile. For example, various attempts have been made to lighten various interior or exterior materials forming the automobile, and at the same time, efforts have been made to reduce manufacturing costs by processability and process improvements of interior or exterior materials.

Conventionally, as a method for improving the durability and strength of vehicle interior or exterior materials, a sheet formed by mixing polyurethane (PU) and glass fiber has been used, or a low weight reinforced thermoplastic (LWRT), which is a sheet-type material formed by mixing polypropylene (PP) and glass fiber, has mainly been used.

However, in the case of a material including glass fiber as described above, there is a problem in that a large amount of dust due to glass fiber is generated during work operations, thereby deteriorating the health of workers and the work environment. Further, when scraps are generated, the material cannot be recycled due to being combined with other materials and should be discarded.

Accordingly, there is an urgent need to develop a composite which can solve problems related to dust generation during operation as a result of not mixing glass fiber, can be recycled, has improved durability and strength, and is lightweight.

DISCLOSURE

Technical Problem

It is an object of the present invention to provide a vehicle interior or exterior material including a polyester resin foam layer and a fiber layer.

Technical Solution

In order to achieve the object, the present invention provides vehicle interior or exterior material including: a polyester resin foam layer; and a fiber layer, formed on one surface or both surfaces of the resin foam layer, where a mass per unit area is in a range of 500 to 1,100 g/m².

Advantageous Effects

The present invention provides a vehicle interior or exterior material which can improve a working environment, has improved durability and strength, and is lightweight.

BEST MODE OF THE INVENTION

As embodiments allow for various changes and numerous embodiments, exemplary embodiments will be illustrated in the drawings and described in detail in the written description. However, this is not intended to limit embodiments to particular modes of practice, and it is to be appreciated that all changes, equivalents, and substitutes that do not depart from the spirit and technical scope of embodiments which are encompassed in the embodiments. In the description of embodiments, certain detailed explanations of the related art are omitted when it is deemed that they may unnecessarily obscure the essence of the inventive concept.

While such terms as "first," "second," etc., may be used to describe various components, such components must not be limited to the above terms. The above terms are used only to distinguish one component from another.

The terminology used herein to describe embodiments of the invention is not intended to limit the scope of the invention. As used herein, the singular forms "a," "an" and "the" are intended to include the plural forms as well, unless the context clearly indicates otherwise.

It will be further understood that the terms "comprises" and/or "comprising," when used in the present invention, specify the presence of stated features, integers, steps, operations, elements, and/or combinations thereof, but do not preclude the presence or addition of one or more other features, integers, steps, operations, elements, components, and/or combinations thereof.

Therefore, since the embodiments described in this specification and configurations illustrated in drawings are only exemplary embodiments and do not represent the overall technological scope of the invention, it is understood that the invention covers various equivalents, modifications, and substitutions at the time of filing of this application.

The present invention relates to a vehicle interior or exterior material in which a polyester resin foam layer and a fiber layer are combined. Specifically, the polyester resin foam layer may refer to a polyester foam, and the foam may be a foam sheet foamed in the form of a sheet.

As an example, a vehicle interior or exterior material according to the present invention includes: a polyester resin foam layer; and a fiber layer, formed on one surface or both surfaces of the resin foam layer, in which a mass per unit area is in a range of 500 to 1,100 g/m².

Specifically, the vehicle interior or exterior material may have a mass per unit area in the range of 500 to 1,100 g/m². For example, the vehicle interior or exterior material may have a mass per unit area in the range of 550 to 1,000 g/m², 600 to 1,000 g/m² or 800 to 900 g/m². When the mass per unit area is within the above-described ranges, it can be confirmed that the vehicle interior or exterior material according to the present invention is light-weight.

As an example, in the polyester resin foam layer, 90% or more of cells are closed cells (DIN ISO 4590), which means that the quantity of closed cells among cells of the polyester foam sheet measured according to DIN ISO 4590 is 90% (v/v) or more. For example, the average ratio of closed cells in the polyester resin foam layer may be in the range of 90 to 100% or 95 to 99%. When the polyester resin foam layer according to the present invention has closed cells within the above-mentioned range, the excellent characteristics of durability, rigidity, and strength can be realized in the production of the vehicle interior or exterior material. For example, the number of cells of the polyester resin foam layer may include 1 to 30 cells, 3 to 25 cells, or 3 to 20 cells per 1 mm$^2$.

Further, the average size of the cells may be in the range of 100 to 800 μm. For example, the average size of the cells may be in the range of 100 to 700 μm, 200 to 600 μm, or 300 to 600 μm. Here, a variation in cell size may be, for example, 5% or less, 0.1 to 5%, 0.1 to 4% or 0.1 to 3%. Accordingly, it can be seen that the polyester resin foam layer according to the present invention has uniformly foamed cells having a uniform size.

As an example, the polyester resin foam layer according to the present invention may be an extrusion foam molded article. Specifically, the types of foaming methods include bead foaming and extrusion foaming. Bead foaming is generally a method of heating resin beads to form a primary foaming product, aging the product for a suitable period of time, filling a plate-shaped or cylindrical mold with the product, heating it again, and fusing and molding the product by secondary foaming. On the other hand, extrusion foaming is a method of heating and melting the resin and continuously extruding and foaming the resin melt, which can simplify the process steps, enable mass-production, and prevent cracks between the beads and granular fractures which occur during bead foaming, thereby realizing superior flexural and compressive strength.

As another example, the polyester resin foam layer according to the present invention may have a flexural strength of 10 N or more which is measured when a specimen is fixed with a 100 mm support span and a flexural load is applied thereto at a rate of 5 mm/min according to ASTM D 790. Specifically, the flexural strength may be in the range of 22 to 250 N, 25 to 210 N, 30 to 200 N, or 50 to 180 N. The polyester resin foam layer according to the present invention can ensure excellent rigidity and prevent deformation caused by physical impact or force by controlling the flexural strength to be in the above-described range.

The vehicle interior or exterior material according to the present invention may have a noise absorption rate of 0.4 NRC or more measured according to KS F 2805, and a sound transmission loss value of 10 dB or more measured according to KS F 2080.

For example, the noise absorption rate may be in the range of 0.4 to 1 NRC or 0.4 to 0.6 NRC, and the noise reduction rate may be in the range of 10 to 30 dB or 15 to 25 dB. As such, the vehicle interior or exterior according to the present invention can realize both absorption and insulation of noise at a high level and can effectively insulate or absorb the noise inside and outside of the vehicle.

The vehicle interior or exterior material may satisfy the following Expression 1 after a severe condition including a step of leaving the vehicle interior or exterior material at a temperature of 90±1° C. for 24 hours and a step of leaving the vehicle interior or exterior material at a temperature of 50±1° C. and a relative humidity of 90% for 24 hours:

$$|V_1 - V_0|/V_0 \times 100 \le 5\%$$ [Expression 1]

In Expression 1, $V_0$ is a volume (mm$^3$) of the vehicle interior or exterior material before exposure to the severe condition, and $V_1$ is a volume (mm$^3$) of the vehicle interior or exterior material after exposure to the severe condition.

Specifically, a dimensional change rate of a sample of a vehicle interior or exterior material before and after the severe condition was measured. This is a measurement value corresponding to the long-term dimensional change rate after application of the vehicle interior or exterior material to a vehicle. For example, the volume may refer to a value calculated by multiplying each of the length, width and thickness of the vehicle interior or exterior material. For example, a dimensional change rate of Expression 1 may be in the range of 0.01 to 5%, 0.01 to 3% or 0.01 to 1%. When values of Expression 1 within the above-described ranges are satisfied, it can be seen that the shape of the vehicle interior or exterior material according to the present invention is not changed even after long-term use in an environment with rapid changes in temperature.

Here, when a value of Expression 1 exceeds 5%, it may mean that peeling, swelling, sagging, discoloration or deformation of the vehicle interior or exterior material easily occurs.

In the vehicle interior or exterior material, a color difference change rate before and after irradiation of light having a wavelength of 300 to 400 nm at an irradiation dose of 126 MJ according to an accelerated light resistance test (ultraviolet carbon arc light resistance test) of KS R 0021 may be less than 3%, and a grayscale change rate may be less than 3%.

For example, a color difference change rate and a grayscale change rate each may be in the range of 0.1 to 3%, 0.1 to 1.5% or 0.1 to 1%. When the above-described ranges are satisfied, it can be seen that the vehicle interior or exterior material according to the present invention has excellent light resistance against external light, and can prevent a change in physical properties due to long-term use.

As an example, the polyester resin foam layer according to the present invention may have an average thickness in the range of 1 to 30 mm, and the fiber layer may have an average thickness in the range of 0.1 to 10 mm.

For example, the polyester resin foam layer may have a thickness in the range of 1.5 to 30 mm, 5 to 30 mm, 5 to 20 mm or 5 to 10 nm. Further, a thickness of the fiber layer may be in the range of 0.5 to 10 mm, 0.5 to 8 mm, or 0.5 to 5 mm. Accordingly, the vehicle interior or exterior material according to the present invention can realize properties such as excellent flexural strength, long-term numerical strain, light resistance and/or an excellent heat insulation in spite of a relatively thin thickness thereof. Further, it is possible to reduce the weight of the vehicle interior or exterior material so that excellent fuel efficiency can be realized in terms of the application of the automobile interior or exterior material.

As another example, the polyester resin foam layer may be a polyethylene terephthalate (PET) resin foam layer, and the fiber layer may include a polyethylene terephthalate fiber layer.

The polyester resin mainly used thus far is a high molecular weight aromatic polyester resin produced by a condensation polymerization reaction of terephthalic acid and 1,4-butanediol. Here, the high molecular weight polyester may refer to a polymer having a limiting viscosity [η] of 0.8 (dL/g) or more. The aromatic polyester resin has excellent physical properties such as high molecular weight, thermal stability, tensile strength, and the like, but does not decompose and remains in the natural ecosystem for a long time after disposal, causing serious environmental pollution problems.

Specific examples of the type of the polyester usable in the present invention include one or more selected from the group consisting of polyethylene terephthalate (PET), polybutylene terephthalate (PBT), polylactic acid (PLA), polyglycolic acid (PGA), polypropylene (PP), polyethylene (PE), polyethylene adipate (PEA), polyhydroxyalkanoate (PHA), polytrimethylene terephthalate (PTT), and polyethylene naphthalate (PEN).

Specifically, in the present invention, polyethylene terephthalate (PET) may be used as the polyester.

Further, the vehicle interior or exterior material according to the present invention has a structure in which the polyethylene terephthalate resin foam layer and the polyethylene terephthalate fiber layer are laminated, and thus can be easily recycled. In order to recycle scraps remaining after a molding process, and materials used for automobile interior or exterior materials in the process of scrapping cars or the like, decomposition and separation processes for each component are required, and thus most of the scraps and materials are disposed of, and the costs for disposal thereof incur separately. However, in the composite according to the present invention, the foam sheet and the resin layer are both formed of polyester materials, and thus it is not necessary to separate each layer and the composite may be melted at once to be recycled.

Further, the vehicle interior or exterior material according to the present invention does not contain glass fibers. Since the composite laminate used in the conventional automobile industry contains glass fibers, there is a problem in that dust caused by glass fibers is generated during processing. The vehicle interior or exterior material according to the present invention does not contain glass fiber, and thus the weight can be lightened and the generation of glass dust generated during processing can be prevented. Further, the present invention provides a vehicle interior or exterior material having excellent rigidity, strength, and durability. In the present invention, the "glass fiber is not contained" means that, for example, the content of the glass fiber is 1 wt % or less, 0.01 wt % or less, 1 to 0.001 wt %, or 0.01 to 0.001 wt % based on the weight of the total vehicle interior or exterior material, and specifically, it means that the glass fiber is substantially not contained.

As an example, the polyester fiber layer is formed of an aggregate of modified cross-section hollow fibers. The modified cross-section hollow fiber has a hollow part, a shape maintaining part, and a volume control part on the basis of a cross-sectional shape, in which the volume control part may have a shape which protrudes in a direction opposite to a center of a fiber in which an end part has a round shape.

Specifically, the volume control part may have a shape which protrudes in a direction opposite to a center of a fiber in which an end part has a round shape.

In the present invention, the cross-sectional structure of the modified cross-section hollow fiber is described as a hollow part, a shape maintaining part, and a volume control part, but this is for convenience of explanation. The cross-sectional structure of the modified cross-section hollow fiber includes a hollow part formed with a hole therein along the longitudinal direction of the fiber, and a shape maintaining part surrounding the hollow part.

Further, the shape maintaining part has a concavo-convex portion formed on the outer circumferential surface on the opposite side of the hollow part on the basis of a cross-sectional shape, and a protruding portion in the concavo-convex portion is referred to as a volume control part.

Specifically, a polyester resin may be used as the modified cross-section hollow fiber, and for example, polyethylene terephthalate (PET) may be used. A melt viscosity of the melt-spun PET polymer may range from 0.60 to 0.64, and an in-out type radiation cylinder capable of maximizing a cooling effect is suitable for use therein. A thickness of the fiber may vary from 4 to 15 denier, and a fiber length may be in the range of 22 to 64 mm.

A hollow rate of the hollow part may range from about 15 to 30% of the total area of the fiber. When the hollow rate exceeds the above-described range, there may be a problem with fiber formability. When the hollow rate is less than the above-described range, a hollowness retention property and various functionalities of the present invention may be limited. The shape maintaining part refers to a fibrous shape between the hollow part and the volume control part.

The volume control part may have a shape which protrudes in a direction opposite to a center of a fiber in which an end part has a round shape. Here, the uppermost portion of the end part may be defined as a peak, and the space between the volume control parts may be defined as a valley. Here, the radius of curvature of the peak may be defined as R, the radius of curvature of the valley may be defined as r, and R and r values may be identical or different for each volume control part.

As another example, the vehicle interior or exterior material according to the present invention may further include an adhesive layer formed between the polyester resin foam layer and the fiber layer. Specifically, the vehicle interior or exterior material according to the present invention may have a structure in which the polyester resin foam layer and the fiber layer are bonded together with an adhesive layer interposed therebetween. For example, the adhesive layer may include a polyester-based adhesive resin layer interposed between the polyester resin foam layer and the fiber layer.

The polyester-based adhesive resin layer may be prepared within various types of extrudates and film moldings. Further, the polyester-based adhesive resin layer according to the present invention may be prepared within a web. The polyester-based adhesive resin layer according to the present invention may be provided as a nonwoven fabric of a film or a web structure through pressing in multiple layers as a result of having a low melting point. The polyester composite according to the present invention may be prepared by interposing the polyester-based adhesive resin layer between the foam layer and the biaxially oriented film, and then pressing with a pressure roller, or heat bonding with heat.

Specifically, the polyester-based adhesive resin layer may be a polyester-based elastic adhesive resin which is a condensation-polymerization product of a soft segment, which is a polyol, and a hard segment, which is an esterification reaction product of a diol and a dicarbonic acid.

Specifically, the diol may include ethylene glycol (EG) or a mixture of ethylene glycol (EG) and 2-methyl 1,3-propanediol (MPO), and the dicarbonic acid may include terephthalic acid (TPA), or a mixture of terephthalic acid (TPA) and an anhydride resin.

The diol may include 1,4-butanediol (1,4-BD) or a mixture of 1,4-butanediol (1,4-BD) and 2-methyl 1,3-propanediol (MPO), and the dicarbonic acid may include dimethyl terephthalate (DMT) or a mixture of dimethyl terephthalate (DMT) and an anhydride resin.

The polyol may include one or more of poly(tetramethylene ether) glycol (PTMG), polyethylene glycol (PEG), and polypropylene glycol (PPG).

The anhydride resin may be one or more of methyl tetrahydrophthalic anhydride (MeTHPA), methylhexahydrophthalic anhydride (MeHHPA), terahydrophthalic anhydride (THPA) and hexahydrophthalic anhydride (HHPA).

The molar ratio of the mixture of the terephthalic acid (TPA) and the anhydride resin may be 40 to 99:60 to 1.

The molar ratio of the mixture of the dimethyl terephthalate (DMT) and the anhydride resin may be 40 to 99:60 to 1.

As an example, the vehicle interior or exterior material according to the present invention may have an average thickness in the range of 1.1 to 5.2 mm. Specifically, the vehicle interior or exterior material may have a thickness in the range of 1.3 to 5 mm, 1.5 to 4.8 mm, 2 to 4.6 mm, 2.4 to 4.4 mm, 2.8 to 4.2 mm, 3 to 4.1 mm or 3.5 to 4 mm. When the average thickness of the vehicle interior or exterior material according to the present invention is within the above-described range, it is possible to prevent a decrease in strength and rigidity while realizing weight reduction.

As another example, an average basis weight of the polyester resin foam layer according to the present invention may be in the range of 300 to 3,000 g/m². Specifically, the average basis weight may be in the range of 350 to 2,500 g/m², 380 to 2,000 g/m², 400 to 1,500 g/m², 430 to 1,000 g/m², 450 to 950 g/m², 480 to 900 g/m², 500 to 850 g/m², 530 to 800 g/m² or 550 to 750 g/m². When the average basis weight of the polyester resin foam layer according to the present invention is within the above-described range, it is possible to realize an improved flexural strength and flexural modulus while satisfying lightness of weight, thereby facilitating transportation and construction during working.

As an example, the vehicle interior or exterior material according to the present invention may have a structure in which a biaxially oriented polyester film and a polyester fiber layer are sequentially stacked on one surface or both surfaces of the polyester resin foam layer.

As another example, the polyester resin foam layer may be a polyethylene terephthalate (PET) resin foam layer, the biaxially oriented polyester film may be a polyethylene terephthalate biaxially oriented film, and the polyester fiber layer may include polyethylene terephthalate fibers.

The vehicle interior or exterior material according to the present invention may have a structure in which the polyester resin foam layer; the biaxially oriented polyester film; and the polyester fiber layer are sequentially stacked and bonded by thermal fusion or thermal bonding without an adhesive material. Further, the vehicle interior or exterior material according to the present invention may have a structure in which the polyester resin foam layer and the biaxially oriented film are bonded by the adhesive material interposed therebetween, or the biaxially oriented film and the polyester fiber layer are bonded by the adhesive material interposed therebetween.

As an example, a polyester-based adhesive resin layer, which is formed at one or more positions of between the polyester resin foam layer and the biaxially oriented polyester film and between the biaxially oriented polyester film and the polyester fiber layer, may be further included. The polyester-based adhesive resin layer may be a polyester-based elastic adhesive resin which is a condensation-polymerization product of a soft segment, which is a polyol, and a hard segment, which is an esterification reaction product of a diol and a dicarbonic acid.

Specifically, when the vehicle interior or exterior material of the present invention further includes a polyester-based adhesive resin layer interposed between the polyester resin foam layer and the biaxially oriented polyester film, and/or between the biaxially oriented polyester film and the polyester fiber layer, the vehicle interior or exterior material may be a polyester composite in which a polyester resin foam layer; a first polyester-based adhesive resin layer; a biaxially oriented polyester film; a second polyester adhesive resin layer; and a polyester fiber layer are sequentially stacked.

The vehicle interior or exterior material according to the present invention having such a structure may have each layer formed of the same components, and thereby interlayer adhesiveness may be improved, peeling may be prevented, and further, recycling becomes easy.

As an example, the biaxially oriented polyester film according to the present invention may be stretched 2 to 8-fold in a longitudinal direction (machine direction=MD) and 1.1 to 6-fold in a transverse direction (perpendicular to the machine direction=TD), and may have a total draw ratio of 1.5 to 7-fold.

Specifically, the biaxially oriented polyester film according to the present invention may be prepared by stretching an unstretched polyester film in the longitudinal direction (machine direction=MD) at a temperature range of about 90 to 120° C. to about 2 to 8-fold and stretching the film in the transverse direction (perpendicular to the machine direction=TD) at a temperature range of about 100 to 140° C. to about 1.1 to 6-fold, and then heat-treating the film at a temperature range of about 220 to 240° C. When the biaxially oriented film is used, excellent durability, rigidity, and strength can be realized without increasing the thickness of the vehicle interior or exterior material according to the present invention, and the weight of the composite can be reduced to facilitate construction.

As another example, an average thickness of the biaxially oriented polyester film according to the present invention may be in the range of 60 to 350 μm, 90 to 340 μm, 100 to 330 μm, 120 to 320 μm, 130 to 310 μm, 150 to 300 μm, 180 to 280 μm, 200 to 270 μm, or may be 250 μm. When the average thickness of the biaxially oriented film is within the above-described range, the flexural modulus of the vehicle interior or exterior material is increased, and thus significantly improved rigidity can be realized.

The vehicle interior or exterior material according to the present invention may be comprised in one or more of a head liner, a flow under cover, an engine room cover, a trunk room panel, a package tray, a seatback and a bumper.

As an example, the head liner may be a head liner panel which is mounted to an inner side of a roof panel of an automobile. Here, the head liner may have a flexural modulus or stiffness of 400 to 3,000 MPa which is measured when a specimen is fixed with a 100 mm support span and a flexural load is applied thereto at a rate of 5 mm/min according to ASTM D 790. Specifically, the head liner may have a flexural modulus in the range of 450 to 2,500 Mpa, 500 to 2,000 Mpa, 550 to 1,500 Mpa or 700 to 1,000 Mpa. The head liner according to the present invention can ensure excellent rigidity and prevent deformation caused by physical impact or force by controlling the flexural modulus to be in the above-described range.

As another example, the flow under cover may have a flexural strength (N) in the range of 100 to 500 N which is measured when a specimen is fixed with a 100 mm support span and a flexural load is applied thereto at a rate of 5 mm/min according to ASTM D 790. For example, the flexural strength may be in the range of 150 to 500 N, 200 to 500 N or 300 to 500 N. When the flexural strength of the flow under cover according to the present invention satisfies the above-described range, it may be safer against external impact due to high strength.

The flow under cover is mounted on a bottom surface of a vehicle, and is installed at the bottom of an engine, a transmission, and a cooling fan or the like to protect the engine and the transmission from external impact. In addition, it may prevent noise generated from the engine or transmission during driving from being emitted to the outside and prevent foreign matter from entering an automobile from the outside. The flow under cover according to the present invention can effectively protect the engine and the transmission from externally applied impact, can satisfy physical properties such as excellent flame retardancy, strength, sound absorption and sound insulation and the like, and is lightweight, and thus it is also effective in reducing fuel consumption of automobiles.

As another example, the engine room cover according to the present invention may have a combustibility of 50 mm/min or less based on ISO 3795: 1989. Specifically, the combustibility may be measured by preparing a 100 mm (width)×350 mm (length) test specimen, allowing the flame of the combustion test device to contact the one end of the specimen for 15 seconds, removing the flame, and calculating a combustion speed according to the following Equation 1.

$$B = D/T \times 60 \quad \text{[Equation 1]}$$

In Equation 1, B represents a combustion speed (mm/min), D represents a combustion length (mm), and T represents a combustion time (seconds).

As another example, the trunk room panel according to the present invention may have a flexural modulus in the range of 400 to 30,000 MPa which is measured when a specimen is fixed with a 100 mm support span and a flexural load is applied thereto at a rate of 5 mm/min according to ASTM D 790. In the present invention, the trunk room panel refers to a panel which separates a riding area and a trunk area in a vehicle, and specifically, the flexural modulus of the trunk room panel may be in the range of 500 to 30,000 Mpa, 550 to 25,000 Mpa, 600 to 20,000 Mpa, 650 to 10,000 Mpa, 700 to 5,000 Mpa, 750 to 4,000 Mpa, 800 to 3,000 Mpa or 860 to 1,000 Mpa. Accordingly, it is possible to satisfy further improvements in rigidity. Stiffness refers to the degree of hardness or rigidity of the material. When the flexural modulus satisfies the above-described range, a trunk room panel which is less deformed by physical impact or force due to having improved rigidity and durability can be provided.

As another example, the package tray according to the present invention may have an absorption amount of 2% or less measured according to ASTM D 570. Here, the package tray panel is installed behind a rear seat. Specifically, the package tray panel is comprised of a vehicle interior or exterior material which supports a rear seat, allows the rider on the rear seat to store various parts and documents, and is equipped with functional parts such as a speaker and a fragrance as required. Excellent durability and moisture resistance are required for the package tray panel. Specifically, the absorption amount of the package tray may be 1.8 g/100 cm$^2$ or less, 1.5 g/100 cm$^2$ or less, 1 g/100 cm$^2$ or less, 0.01 to 0.5 g/100 cm$^2$ or 0.1 to 0.4 g/100 cm$^2$. When the absorption amount of the package tray panel according to the present invention satisfies the above-described range, moisture resistance is improved to facilitate storing of the panel outside, and moisture resistance and strength can be prevented from being lowered even when the panel is used for a long period of time.

FIGS. 1 to 4 each schematically show the cross-sectional structure of the vehicle interior or exterior material according to the present invention.

Figure 1:
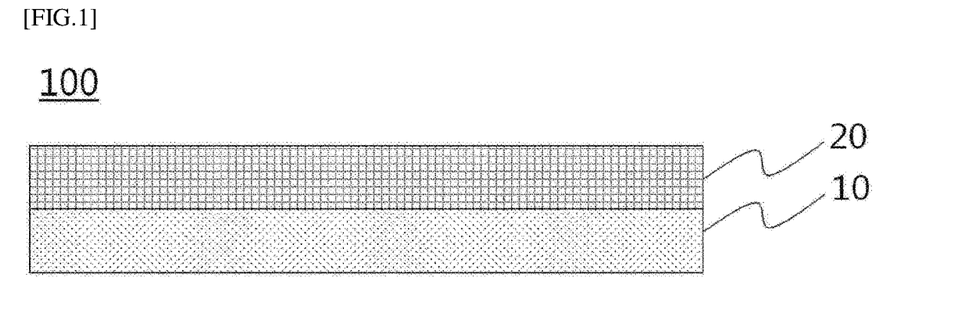
FIGS. 1 to 4 each are cross-sectional views of a vehicle interior or exterior material according to an embodiment of the present invention.

FIG. 1 is a cross-sectional view of a vehicle interior or exterior material 100 having a structure in which a fiber layer 20 is bonded to a polyester resin foam layer 10. The polyester resin foam layer 10 and the fiber layer 20 are thermally fused or thermally bonded without an adhesive layer interposed therebetween.

Figure 2:
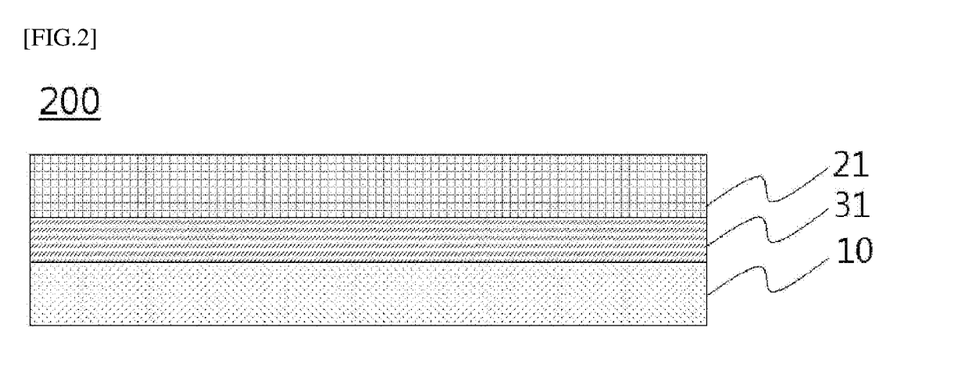

The vehicle interior or exterior material 200 shown in FIG. 2 has a structure in which a polyester resin foam layer 10, a polyester-based adhesive resin layer 31 and a fiber layer 21 are sequentially bonded.

Figure 3:
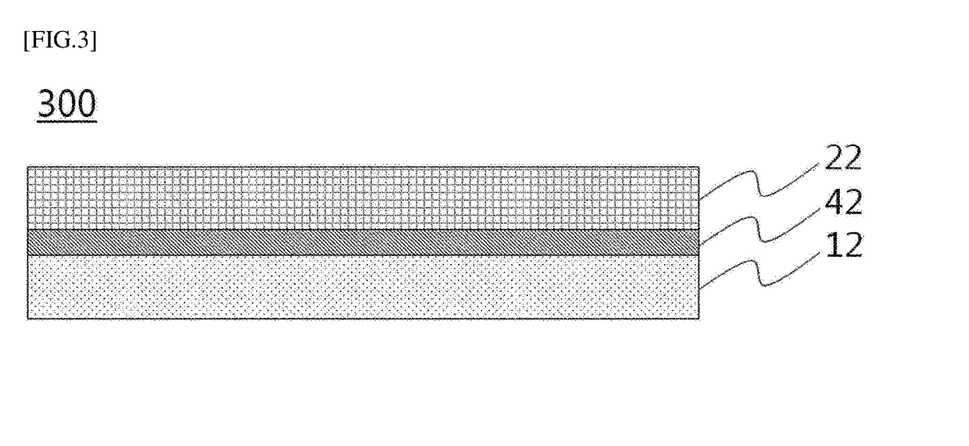

The vehicle interior or exterior material 300 shown in FIG. 3 has a structure in which a polyester resin foam layer 12, a biaxially oriented polyester film 42 and a fiber layer 22 are thermally fused.

Figure 4:
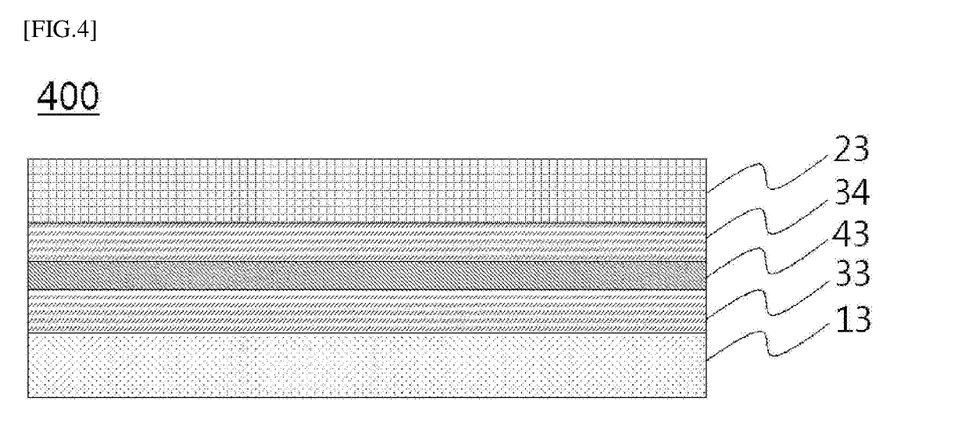

Further, the vehicle interior or exterior material 400 shown in FIG. 4 has a structure in which a polyester resin foam layer 13, a first polyester-based adhesive resin layer 33; a biaxially oriented polyester film 43; a second polyester adhesive resin layer 34; and a polyester fiber layer 23 are sequentially stacked. The vehicle interior or exterior material of the present invention having such a structure can realize enhanced strength and durability while preventing an overall thickness from becoming too thick.

MODE OF THE INVENTION

Hereinafter, the present invention will be further described in detail with reference to examples and comparative examples, but the scope of the present invention is not limited thereto.

Example 1: Preparation of Vehicle Interior or Exterior Material

First, in order to prepare the polyester composite according to the present invention, 100 parts by weight of a polyethylene terephthalate (PET) resin was dried at 130° C. to remove moisture. The PET resin from which the moisture was removed, and 1 part by weight of pyromellitic dianhydride (PMDA), 1 part by weight of talc, and 0.1 part by weight of Irganox (IRG 1010) based on 100 parts by weight of the PET resin from which the moisture was removed were mixed in a first extruder and heated to 280° C. to prepare a resin melt. Next, 5 parts by weight of a gas mixture, in which carbonic acid gas and pentane were mixed in a ratio of 5:5, as a foaming agent based on 100 parts by weight of the PET resin was introduced into the first extruder, and the resin melt was extruded and foamed to prepare a polyester resin foam layer. The polyester resin foam layer thus prepared had a density of about 300 kg/m$^3$, a thickness of about 2 mm, and a basis weight of about 600 g/m$^2$.

Thereafter, a polyester-based adhesive resin was applied to both surfaces of the polyester resin foam layer, and then PET nonwoven fabrics having a thickness of 1.5 mm each were attached thereto to prepare a vehicle interior or exterior material.

Here, the total thickness of the vehicle interior or exterior material was 8 mm, and the mass per unit area was adjusted as shown in the following Table 1 by controlling the amount of foaming agent during foaming.

TABLE 1

| | Mass per unit area (g/m$^2$) |
|---|---|
| Example 1 | 600 |
| Example 2 | 800 |
| Example 3 | 1000 |

Comparative Example 1

The vehicle interior or exterior material was prepared using a low melting fiber (LMF). Here, it was confirmed that the vehicle interior or exterior material prepared in the comparative example had a thickness of 8 mm, and a mass per unit area of 1200 g/m².

Comparative Example 2

An urethane-based adhesive was applied to both surfaces of the polyurethane foam, and then PET nonwoven fabrics were adhered to each of the both surfaces to prepare a vehicle interior or exterior material. Here, it was confirmed that a thickness was 8 mm, and a mass per unit area was 800 g/m².

Experimental Example 1: Measurement of Physical Properties

The combustibility, heat resistance and light resistance of the vehicle interior or exterior material prepared in Examples 1 to 3 and Comparative Examples 1 to 2 were measured. The measurement method is described below, and the results are shown in the following Table 2.

1) Measurement of Flexural Strength
Flexural strength was measured under the conditions of ASTM D 638.

2) Measurement of Combustibility
Combustibility was measured under the conditions of KS M ISO 9772.

3) Measurement of Light Resistance
A grayscale change rate was measured according to an accelerated light resistance test method of KS R 0021.

TABLE 2

|  | Flexural strength (N/cm²) | Combustibility (mm/min) | Grayscale change rate (%) |
|---|---|---|---|
| Example 1 | 32 | 25 | 1 |
| Example 2 | 45 | 18 | 0.7 |
| Example 3 | 58 | 15 | 0.5 |
| Comparative Example 1 | 15 | 50 | 3.5 |
| Comparative Example 2 | 20 | 120 | 4 |

Referring to Table 2, it can be confirmed that the vehicle interior or exterior material according to the present invention had excellent combustibility, light resistance, and flexural strength which were superior to the comparative examples.

Experimental Example 2: Measurement of Dimensional Change Rate

A dimensional change rate test was performed on the vehicle interior or exterior material of Examples 1 to 3 and Comparative Examples 1 to 2. Specifically, after each of the prepared vehicle interior or exterior materials passed through a severe condition including a step of leaving the vehicle interior or exterior material at a temperature of 90±1° C. for 24 hours and a step of leaving the vehicle interior or exterior material at a temperature of 50±1° C. and a relative humidity of 90% for 24 hours, a dimensional change rate was measured by the following Expression 1, and the results are shown in the following Table 3.

$$|V_1 - V_0|/V_0 \times 100 \qquad \text{[Expression 1]}$$

In Expression 1, $V_0$ is a volume (mm³) of the vehicle interior or exterior material before exposure to the severe condition, and $V_1$ is a volume (mm³) of the vehicle interior or exterior material after exposure to the severe condition.

TABLE 3

|  | Dimensional change rate (%) |
|---|---|
| Example 1 | 0.5 |
| Example 2 | 0.3 |
| Example 3 | 0.2 |
| Comparative Example 1 | 6.6 |
| Comparative Example 2 | 8.4 |

Referring to Table 3, it can be confirmed that the vehicle interior or exterior material according to the present invention exhibited a remarkably low dimensional change rate as compared with the comparative examples. Thus, it can be seen that the durability of the vehicle interior or exterior material according to the present invention is excellent.

Experimental Example 3: Measurement of Noise Absorption Performance and Noise Reduction Performance The noise absorption rate and the noise reduction rate of the vehicle interior or exterior materials prepared in Examples 1 to 3 and Comparative Examples 1 to 2 were measured. The measurement method is described below, and the results are shown in the following Table 4.

1) Measurement of Noise Absorption Rate
The noise absorption rate at 0 to 10,000 Hz was measured using a KS F 2805 reverberation method, and a noise reduction coefficient (NRC) value was calculated. NRC is the average value of the noise absorption rates at 250, 500, 1,000 and 2,000 Hz.

2) Measurement of Noise Reduction Rate
The transmission loss values at a frequency of 1 to 8,000 Hz were determined using an Apamat measurement device according to KS F 2862. For comparison, the transmission loss values at 8,000 Hz were compared therewith.

TABLE 4

|  | Noise absorption rate (NRC) | Noise reduction rate (dB) |
|---|---|---|
| Example 1 | 0.4 | 10 |
| Example 2 | 0.4 | 15 |
| Example 3 | 0.4 | 20 |
| Comparative Example 1 | 0.6 | 5 |
| Comparative Example 2 | 0.4 | 8 |

Referring to Table 4, it can be confirmed that, in the case of the vehicle interior or exterior material according to the present invention, a noise reduction rate was in the range of 10 to 20 dB, which was significantly superior to the comparative examples.

Experimental Example 4: Measurement of Cell Properties

The cell size and the cell size deviation of the vehicle interior or exterior materials prepared in Examples 1 to 3 were measured. Specifically, the cell size was measured by SEM imaging of the interior or exterior material, and the deviation of a cell size of 2 mm in width and 2 mm in length was measured. The results are shown in the following Table 5.

TABLE 5

|  | Cell size (μm) | Cell size deviation (%) |
|---|---|---|
| Example 1 | 300 | 5% or less |
| Example 2 | 300 | 5% or less |
| Example 3 | 300 | 5% or less |

Referring to Table 5, it can be confirmed that the foam molded article according to the present invention had a cell size of about 300 μm and a cell size deviation of 5% or less, indicating that the foam molded article was foamed very uniformly.

INDUSTRIAL AVAILABILITY

The present invention provides a vehicle interior or exterior material which can improve the work environment, has improved durability and strength, and is lightweight.

The invention claimed is:

1. A vehicle interior or exterior material, comprising:
a polyester resin foam layer having a mass per unit area in a range of 750 to 1,000 g/m$^2$;
a polyester fiber layer, formed on one surface or both surfaces of the polyester resin foam layer;
a biaxially-oriented polyester film formed between the polyester resin foam layer and the polyester fiber layer;
a first polyester resin adhesive layer formed between the polyester resin foam layer and the biaxially-oriented polyester film; and
a second polyester resin adhesive layer formed between the biaxially-oriented polyester film and the polyester fiber layer,
wherein the polyester resin foam layer is a polyethylene terephthalate (PET) resin foam layer, the polyester fiber layer includes a polyethylene terephthalate fiber layer, and each of the first and second polyester resin adhesive layers is a condensation-polymerization product of a soft segment, which is a polyol, and a hard segment, which is an esterification reaction product of a diol and a dicarbonic acid,
wherein the interior or exterior material has a mass per unit area in a range of 800 to 1,100 g/m$^2$,
wherein the number of cells of the polyester resin foam layer is 1 to 30 cells per 1 mm$^2$,
wherein a variation in cell size of the polyester resin foam layer is 5% or less,
wherein the polyester resin foam layer has a flexural strength of 10 N or more which is measured when a specimen is fixed with a 100 mm support span and a flexural load is applied thereto at a rate of 5 mm/min according to ASTM D 790,
wherein the vehicle interior or exterior material has a noise absorption rate of 0.4 NRC or more which is measured according to KS F 2805, and a sound transmission loss value of 10 dB or more which is measured according to KS F 2080,
wherein the vehicle interior or exterior material satisfies the following Expression 1 after a severe condition including a step of leaving the vehicle interior or exterior material at a temperature of 90±1° C. for 24 hours and a step of leaving the vehicle interior or exterior material at a temperature of 50±1° C. and a relative humidity of 90% for 24 hours:

$$|V_1-V_0|/V_0 \times 100 \leq 5\%$$ [Expression 1]

wherein $V_0$ is a volume (mm$^3$) of the vehicle interior or exterior material before exposure to the severe condition, and $V_1$ is a volume (mm$^3$) of the vehicle interior or exterior material after exposure to the severe condition;
wherein the vehicle interior or exterior material has a color difference change rate of less than 3% and a grayscale change rate of less than 3% before and after irradiation of light having a wavelength of 300 to 400 nm at an irradiation dose of 126 MJ according to an accelerated light resistance test of KS R 0021,
wherein the polyester fiber layer is formed of an aggregate of modified cross section hollow fibers, the modified cross section hollow fiber includes a hollow part, a shape maintaining part and a volume control part on the basis of a cross-sectional shape, and the volume control part has a shape which protrudes in a direction opposite to a center of a fiber in which an end part has a round shape.

2. The vehicle interior or exterior material according to claim 1, wherein 90% or more of cells are closed cells (DIN ISO 4590) in the polyester resin foam layer.

3. The vehicle interior or exterior material according to claim 1, wherein the polyester resin foam layer has an average thickness in a range of 1 to 30 mm, and the fiber layer has an average thickness in a range of 0.1 to 10 mm.

4. The vehicle interior or exterior material according to claim 1, wherein the vehicle interior or exterior material is comprised in one or more of a head liner, a flow under cover, an engine room cover, a trunk room panel, a package tray, a seatback and a bumper.

5. The vehicle interior or exterior material according to claim 4, wherein the head liner has a flexural modulus of 400 to 3,000 MPa which is measured when a specimen is fixed with a 100 mm support span and a flexural load is applied thereto at a rate of 5 mm/min according to ASTM D 790.

* * * * *